United States Patent
Takizawa (10) Patent No.: US 9,106,155 B2
(45) Date of Patent: Aug. 11, 2015

(54) THREE-LEVEL POWER CONVERSION CIRCUIT SYSTEM

(75) Inventor: Satoki Takizawa, Hino (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/349,866

(22) PCT Filed: Sep. 13, 2012

(86) PCT No.: PCT/JP2012/005842
§ 371 (c)(1),
(2), (4) Date: Apr. 4, 2014

(87) PCT Pub. No.: WO2013/051202
PCT Pub. Date: Apr. 11, 2013

(65) Prior Publication Data
US 2014/0247634 A1 Sep. 4, 2014

(30) Foreign Application Priority Data
Oct. 6, 2011 (JP) ................................. 2011-221839

(51) Int. Cl.
*H02M 1/32* (2007.01)
*H02M 7/483* (2007.01)
(Continued)

(52) U.S. Cl.
CPC .............. *H02M 7/483* (2013.01); *H02M 7/487* (2013.01); *H04M 1/32* (2013.01); *H02M 2001/325* (2013.01)

(58) Field of Classification Search
CPC ..................... H02M 3/33569; H02M 3/33592; H02M 3/337; H02M 3/3376; H02M 3/33507; H02M 3/335; H02M 3/33523; H02M 3/33538; H02M 3/3382; H02M 1/32; H02M 1/34; H02M 1/38; H02M 1/12; H02M 7/537; H02M 7/5387; H02M 7/003; H02M 7/53871; H02M 7/538; H02M 7/53875; H02M 7/53806; H02M 7/48; H02M 7/40; H02M 7/487; H02M 2001/325
USPC .......................... 363/17, 20, 21.01, 55–56.05, 363/56.09–56.11, 74, 95, 97, 98, 131, 132
See application file for complete search history.

(56) References Cited

U.S. PATENT DOCUMENTS 8,503,202 B2 * 8/2013 Chimento et al. .......... 363/56.03
2005/0281065 A1 * 12/2005 Nojima ........................... 363/98
(Continued)

FOREIGN PATENT DOCUMENTS

JP 2003-259654 A 9/2003
JP 2008-193779 A 8/2008
(Continued)

*Primary Examiner* — Matthew Nguyen
*Assistant Examiner* — Kevin H Sprenger
(74) *Attorney, Agent, or Firm* — Rabin & Berdo, P.C.

(57) ABSTRACT

A three-level power conversion circuit includes a plurality of one-phase switch circuits which receive power from direct current power supplies that are connected in series. Each of the one-phase switch circuits includes a semiconductor switch series circuit that is connected in parallel to the direct current power supplies, and also a bidirectional switch and a circuit-opening device that are connected in series between a series connection point of the semiconductor switch series circuit and a series connection point of the direct current power supplies. If a semiconductor element in a bidirectional switch fails, the circuit opening device opens a path along which the main current of the semiconductor element flows, and operation of the inverter is continued as a two-level inverter with the remaining bidirectional switches in a constant off-state.

1 Claim, 8 Drawing Sheets (51) Int. Cl.
*H04M 1/32* (2006.01)
*H02M 7/487* (2007.01)

(56) References Cited

U.S. PATENT DOCUMENTS

| | | | |
|---|---|---|---|
| 2009/0244936 A1* | 10/2009 | Falk et al. | 363/40 |
| 2010/0039843 A1 | 2/2010 | Takizawa | |
| 2011/0012543 A1 | 1/2011 | Takizawa et al. | |
| 2011/0051478 A1 | 3/2011 | Sato et al. | |
| 2012/0092915 A1* | 4/2012 | Okuda et al. | 363/132 |
| 2014/0112039 A1* | 4/2014 | Correa Vasquez et al. | 363/98 |

FOREIGN PATENT DOCUMENTS

| | | |
|---|---|---|
| JP | 2010-246189 A | 10/2010 |
| JP | 2010-288416 A | 12/2010 |
| JP | 2011-024369 A | 2/2011 |
| WO | WO-2010/095241 A1 | 8/2010 |

* cited by examiner

THREE-LEVEL POWER CONVERSION CIRCUIT SYSTEM

TECHNICAL FIELD

The present invention relates to a three-level power conversion circuit system having an alternating current motor drive as an object.

BACKGROUND ART

Figure 3:
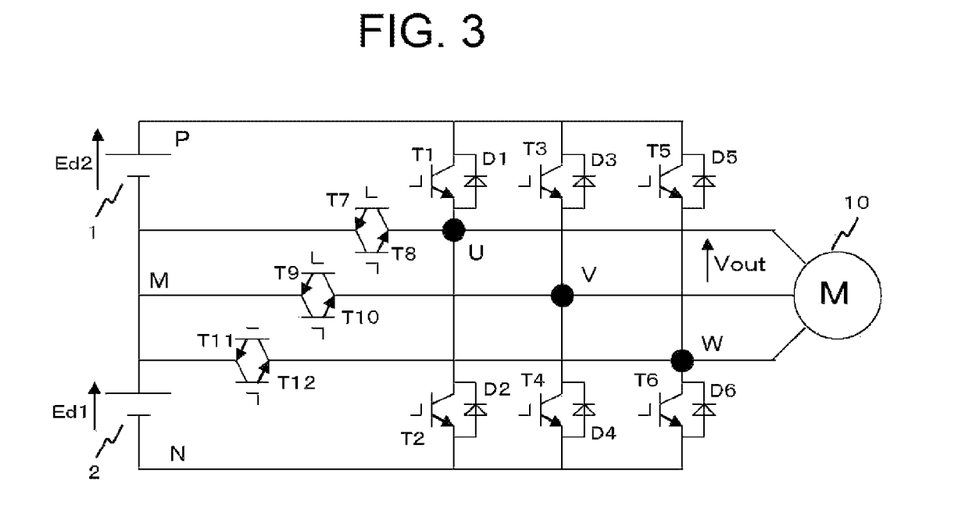
FIG. 3 is an example of a three-level inverter circuit.

FIG. 3 shows an example of a circuit configuration of a three-level inverter that converts power from direct current to alternating current. Direct current power supplies 1 and 2 are connected in series, wherein a positive electrode potential is taken to be P, a negative electrode potential N, and an intermediate point potential M. Generally, when the direct current power supplies are configured of an alternating current power supply system, an unshown rectifier and large capacity electrolytic capacitor can be configured of a 2-series connection, or the like.

A U-phase series circuit, wherein an IGBT T1 to which a diode D1 is connected in anti-parallel and an IGBT T2 to which a diode D2 is connected in anti-parallel are connected in series, a V-phase series circuit, wherein an IGBT T3 to which a diode D3 is connected in anti-parallel and an IGBT T4 to which a diode D4 is connected in anti-parallel are connected in series, and a W-phase series circuit, wherein an IGBT T5 to which a diode D5 is connected in anti-parallel and an IGBT T6 to which a diode D6 is connected in anti-parallel are connected in series, are connected in parallel to the series circuit of the direct current power supplies 1 and 2, thus configuring a three-phase bridge inverter circuit.

Figure 5:
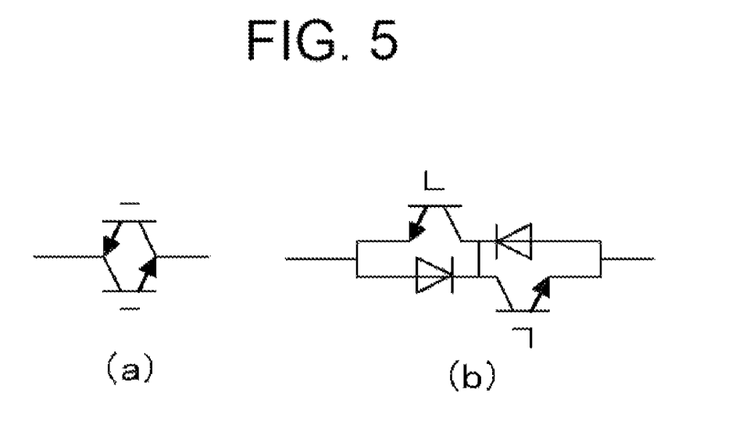
FIG. 5 shows bidirectional switch configuration examples.

A U-phase bidirectional switch wherein reverse blocking IGBTs T7 and T8 are connected in anti-parallel is connected to a series connection point U of the U-phase series circuit and a connection point M of the direct current power supplies 1 and 2, a V-phase bidirectional switch wherein reverse blocking IGBTs T9 and T10 are connected in anti-parallel is connected to a series connection point V of the V-phase series circuit and the connection point M of the direct current power supplies 1 and 2, and a W-phase bidirectional switch wherein reverse blocking IGBTs T11 and T12 are connected in anti-parallel is connected to a series connection point W of the W-phase series circuit and the connection point M of the direct current power supplies 1 and 2. Also, the series connection points U, V, and W are connected to a motor 10, which is the load. Herein, the bidirectional switches can also be realized with a configuration wherein an IGBT that does not have reverse breakdown voltage and a diode are combined, as shown in FIG. 5(b).

Figure 4:
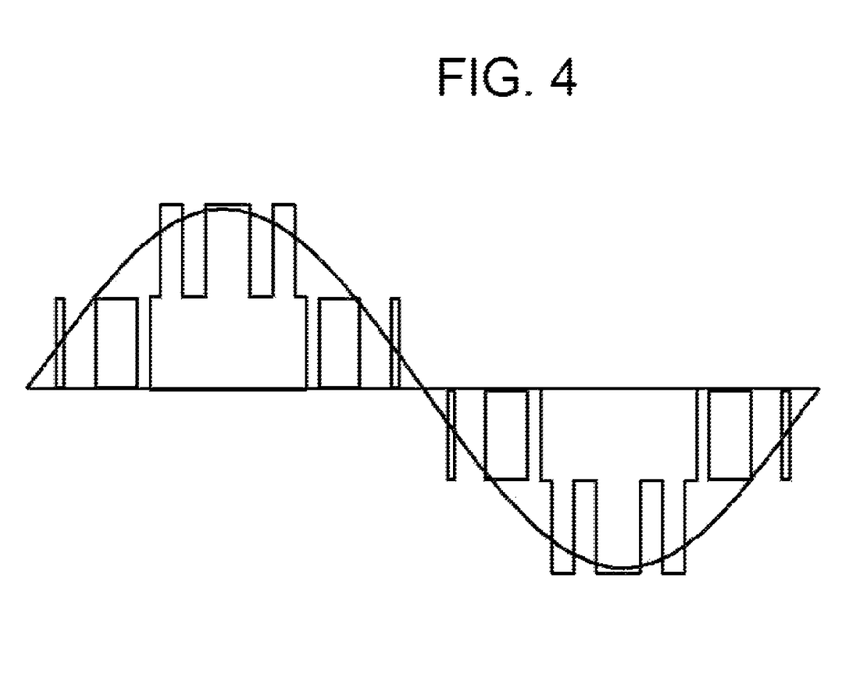
FIG. 4 is an example of a three-level inverter output voltage waveform.

As the P potential, N potential, and M potential can be output as the potential applied to the motor 10 by adopting this circuit configuration, a three-level output inverter is obtained. FIG. 4 shows an output voltage (Vout) waveform example. Three levels of voltage—direct current voltages 0, Ed1, and Ed1+Ed2—can be output. With this method, as low-order harmonic components decrease and it is possible to reduce switch element switching loss with respect to a two-level type inverter, it is possible to construct a highly efficient system.

Figure 6:
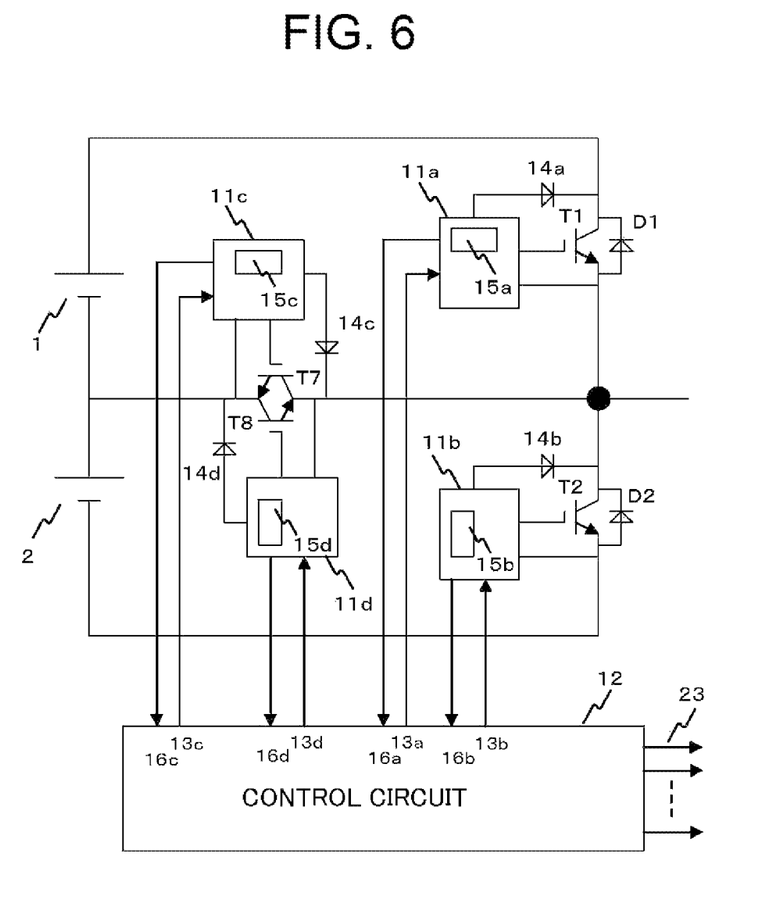
FIG. 6 is a three-level inverter control system diagram.

FIG. 6 shows a one-phase system diagram including gate drive circuits that drive IGBTs and a control circuit that generates gate drive signals. 11a to 11d are connected between the gate and emitter of each IGBT in the gate drive circuits, and on-off control the IGBTs in accordance with gate drive signals 13a to 13d from the control circuit 12. Also, diodes 14a to 14d are connected with the object of detecting the potential of the collector portion of each IGBT, and detection of a power supply short circuit current (arm short circuit current) flowing due to failure of the corresponding IGBT or diode is carried out by detector circuits 15a to 15d in the gate drive circuits. At this time, failure detection signals 16a to 16d are output to the control circuit 12.

Figure 7:
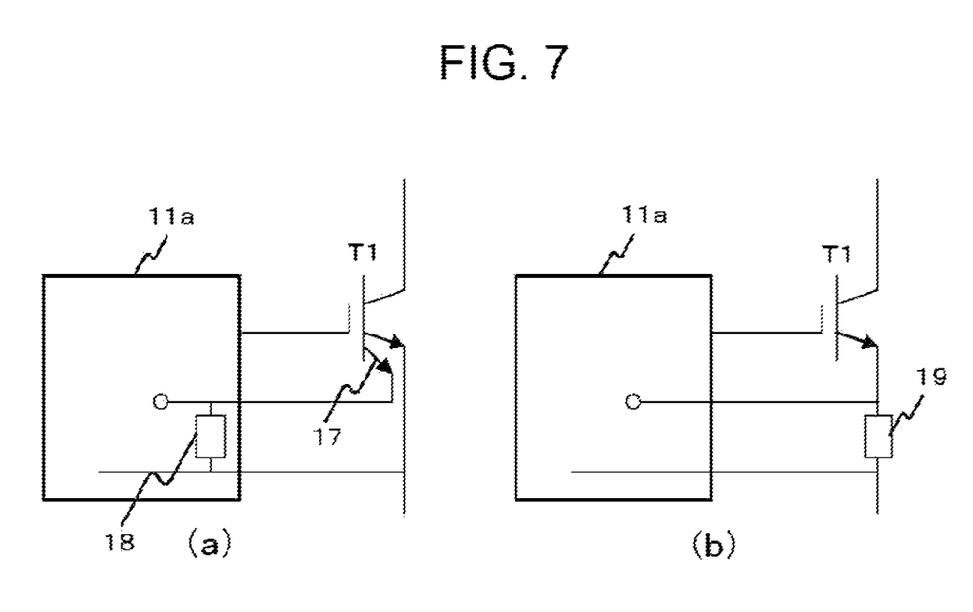
FIG. 7 shows examples of a short circuit current detector circuit.

FIG. 7 shows other methods of detecting an arm short circuit current, wherein FIG. 7(a) is a method whereby the current value is detected by utilizing a sense IGBT 17 incorporated in an IGBT chip (in actuality, a resistor 18 is connected in series, and the voltage across the resistor 18 is detected). FIG. 7(b) shows a method whereby a shunt resistor 19 is connected in series with an IGBT, and the value of the voltage across the shunt resistor 19 is detected. Both methods are such that detection is carried out by detecting an excessive voltage generated across a resistor by an arm short circuit current.

Figure 8:
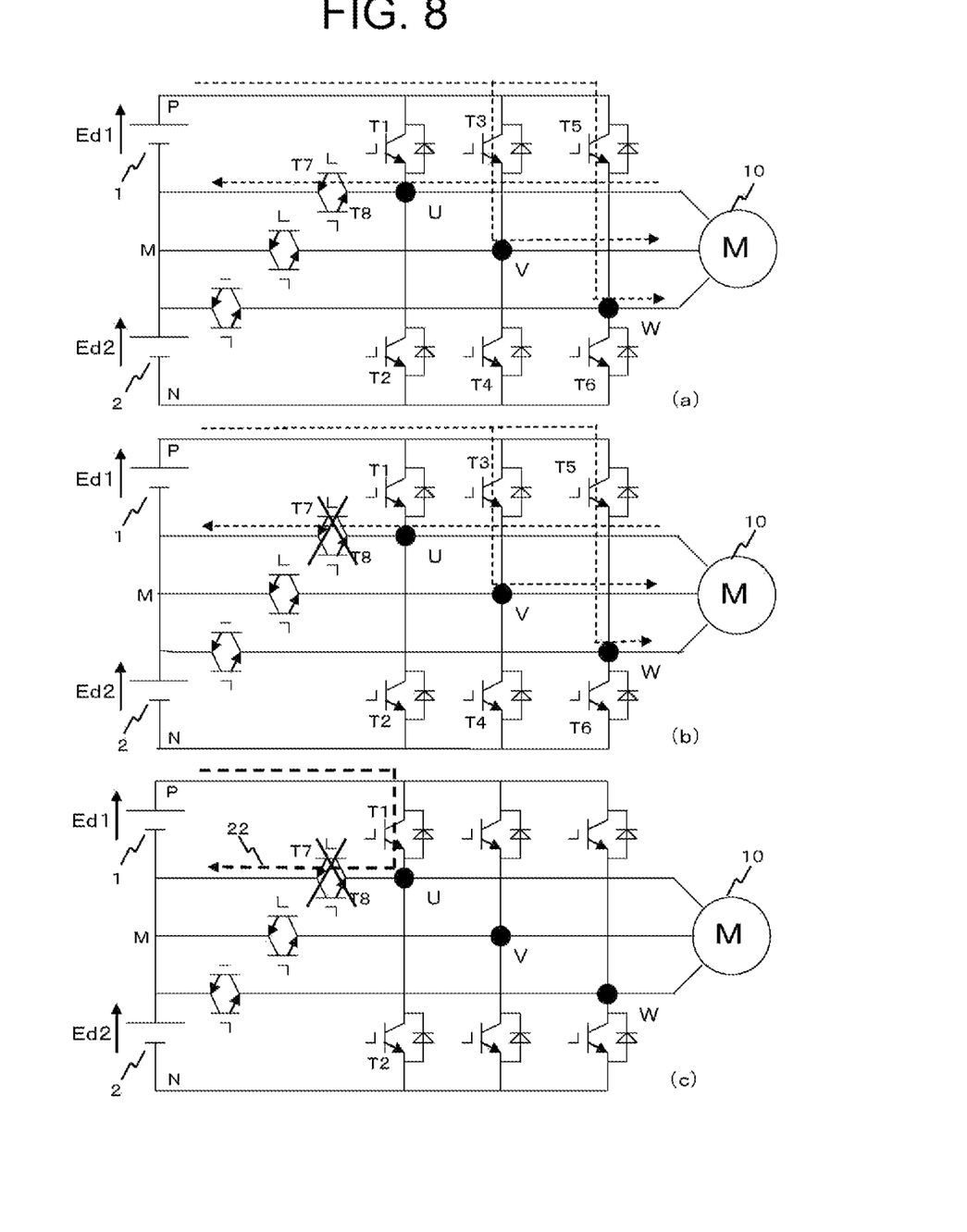

For example, when the IGBT T7 or T8, which is an intermediate side element, fails as in FIG. 8(b) in the condition of FIG. 8(a) (a condition wherein the voltage Ed1 is supplied to the motor from the IGBTs T3 and T5 via the IGBT T7), an excessive power supply short circuit current 22 flows on the IGBT T1 being turned on, as in FIG. 8(c). In general, an IGBT is guaranteed for in the region of 10 μs not to be destroyed by a power supply short circuit current, because of which, provided that the power supply short circuit current is detected within 10 μs by the gate drive circuit of T1, which is a normal IGBT, and the gate is shut off, no secondary damage occurs.

That is, it is understood which arm semiconductor element has failed from the failure detection signal from the gate drive circuit in which a protection operation has been carried out.

A circuit example of the heretofore described three-level inverter is shown in PTL 1, and a method of protecting an IGBT from a power supply short circuit current is shown in PTL 2.

CITATION LIST

Patent Literature

PTL 1: JP-A-2008-193779
PTL 2: JP-A-2010-288416

SUMMARY OF INVENTION

Technical Problem

In general, the kind of inverter system shown in FIG. 3 is such that when a semiconductor switch element or diode fails, the arm thereof takes on a short circuit condition or open circuit condition. As it is not possible to continue inverter operation in either case, it is necessary after the kind of failure detection shown in FIG. 6 that all inverter semiconductor switches are turned off, and the system is stopped.

However, in the case of a system wherein operation needs to be continued, such as an uninterruptible power supply system (UPS), the system structure is such that inverters are connected in parallel and, even in the event that one UPS fails, operation is continued using another UPS (a standby redundancy or parallel redundancy system). However, this kind of system has the problems of an increase in system size and a rise in system price.

Consequently, an object of the invention is to provide a small scale, low priced system such that operation can be continued even when a semiconductor switch element fails.

Solution to Problem

In order to achieve the heretofore described object, a first aspect of the invention is a power conversion circuit converting power from direct current to alternating current or from alternating current to direct current that is capable of outputting three levels of potential, which uses a plurality of one phase switch circuits formed of two direct current power supplies connected in series, a semiconductor switch series circuit wherein first and second semiconductor switches to which diodes are connected in anti-parallel are connected in series connected in parallel to the direct current power supplies, and a bidirectional semiconductor switch circuit connected between a series connection point of the semiconductor switch series circuit and a series connection point of the direct current power supplies, including opening means that, when a semiconductor switch or diode configuring one of the bidirectional semiconductor switch circuits fails, electrically opens a path along which the main current of the semiconductor switch or diode flows, wherein the remaining bidirectional semiconductor switch circuits are in a constant off-state.

A second aspect of the invention is such that, after a semiconductor switch or diode configuring one of the bidirectional semiconductor switch circuits according to the first aspect of the invention fails, operation is continued as a two-level output inverter system using a plurality of the semiconductor switch series circuits connected in parallel to the direct current power supplies.

Advantageous Effects of Invention

According to the invention, operation as an inverter can be continued even when a semiconductor switch or diode configuring a bidirectional semiconductor switch circuit fails, because of which there is no longer a need to construct a parallel redundancy system. As a result of this, it is possible to construct a small scale, low priced power conversion circuit system.

The construction of the system is particularly useful in a system such as an uninterruptible power supply system (UPS) or electric vehicle (EV) wherein operating operations need to be continued even when a semiconductor switch or diode of a bidirectional semiconductor switch circuit fails.

BRIEF DESCRIPTION OF DRAWINGS

FIG. 8($a$) is an illustration of an operation when a bidirectional semiconductor switch fails (T7 conductive condition).

FIG. 8($b$) is an illustration of an operation when a bidirectional semiconductor switch fails (T7 failure occurs).

FIG. 8($c$) is an illustration of an operation when a bidirectional semiconductor switch fails (power supply short circuit condition).

DESCRIPTION OF EMBODIMENTS

The gist of the invention is that a power conversion circuit capable of outputting three levels of potential, which uses a plurality of one phase switch circuits formed of two direct current power supplies connected in series, a semiconductor switch series circuit wherein first and second semiconductor switches are connected in series connected in parallel to the direct current power supplies, and a bidirectional semiconductor switch circuit connected between a series connection point of the semiconductor switch series circuit and a series connection point of the direct current power supplies, includes opening means that, when a semiconductor switch or diode configuring one of the bidirectional semiconductor switch circuits fails, electrically opens a path along which the main current of the semiconductor switch or diode flows, and operation is continued as a two-level inverter with the remaining bidirectional semiconductor switch circuits in a constant off-state. The bidirectional semiconductor switch circuit will hereafter be referred to as a bidirectional switch.

EXAMPLE 1

Figure 1:
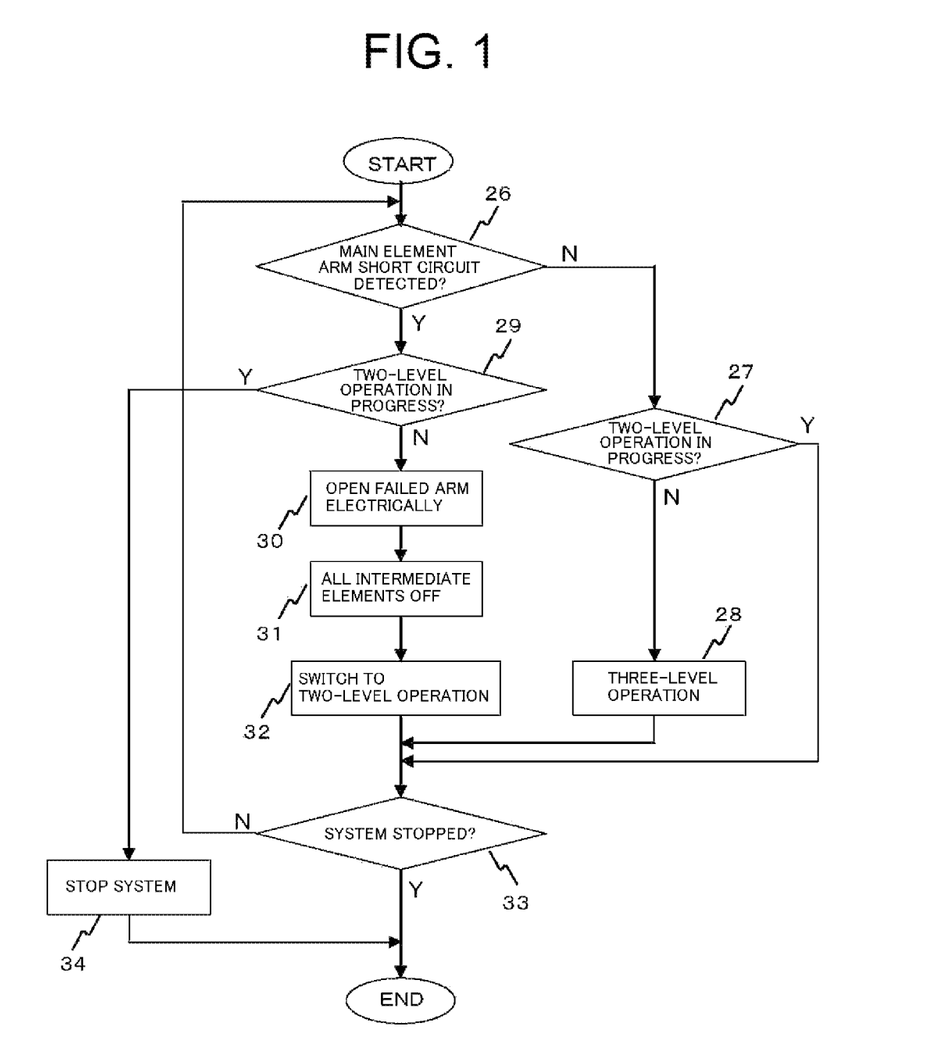
FIG. 1 shows an operational flow chart for an inverter operation of the invention.
Figure 2:
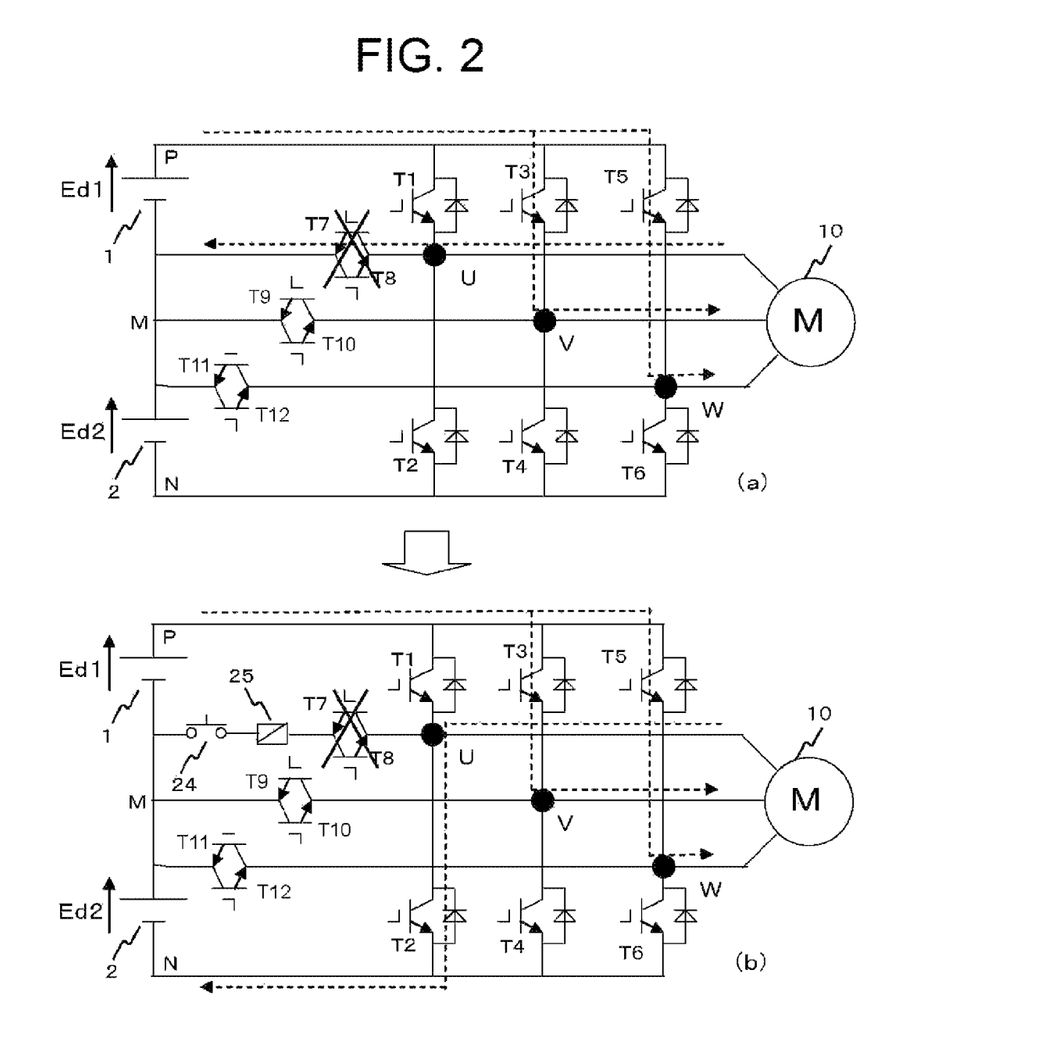
FIG. 2 is an example of an operational mode continuing operation after a bidirectional semiconductor switch fails.

FIG. 1 shows a first example of the invention. FIG. 1 is an operational flow chart for an inverter operation. FIG. 2 shows a circuit diagram for illustrating an operation of continuing operation when a bidirectional switch configured of reverse blocking IGBTs T7 and T8 fails. In order to open the failed bidirectional switch, a mechanical switch 24 and fuse 25 are connected in series to the bidirectional switch (the anti-parallel connection circuit of T7 and T8) connected between a series connection point of direct current power supplies 1 and 2 and a series connection point of IGBTs T1 and T2. The mechanical switch 24 and fuse 25 are also needed for the other bidirectional switches, but are omitted from the drawing.

In the operational flowchart of FIG. 1, if it is not determined in block 26, during normal operation, that there is arm short circuit condition of a main side element, which is an element of a semiconductor switch series circuit, and if it is determined in block 27 that two-level operation is not in progress, the flow moves to block 28, and normal three-level operation is continued.

Meanwhile, if it is determined by signals 16 (16$a$ to 16$d$) shown in FIG. 6 that there is an arm short circuit condition, and if it is determined in block 29 that two-level operation is not in progress, an electrical opening is forcibly carried out by the mechanical switch 24 in block 30, with a signal 23 output from a control circuit 12 as a trigger, so that no current is applied to the failed arm. Also, as a passive method of carrying out an electrical opening, the mechanical switch is rendered unnecessary by the fuse 25 being connected to each arm in an intermediate portion (although the fuse 25 for only one phase is shown in the drawing, in actuality it is needed for all three phases). Furthermore, in block 31, an off command signal is output from the control circuit 12 to all intermediate portion semiconductor switches, which are bidirectional switches, and in block 32, inverter operation is switched to two-level operation using only main side elements.

Also, if it is determined in block 27 that two-level operation is in progress, that two-level operation is continued.

Furthermore, if an arm short circuit is detected in block 26, and furthermore, if it is determined in block 29 that two-level operation is in progress, the system is stopped as it is not possible to continue inverter operation (block 34). As heretofore described, when a bidirectional switch fails, the failed bidirectional switch is cut off using a mechanical switch, fuse, or the like, an off signal is given to the remaining bidirectional switches and, provided that the elements (main elements) of the semiconductor switch series circuit are sound, operation is continued as a two-level inverter.

A main circuit of a two-level inverter is extremely commonplace, and control thereof has been executed to date using a large number of methods, because of which a description thereof is omitted here.

Although IGBTs are adopted as the semiconductor switch elements in the example, the semiconductor switch elements can also be realized using MOSFETs or GTOs.

Also, the invention is also applicable to a method whereby a bidirectional switch circuit is connected to a direct current power supply intermediate potential point in a multilevel circuit of five levels or more.

Industrial Applicability

The invention is a proposal of a system that, when a bidirectional switch element fails in a three-level power conversion circuit using bidirectional switches, can continue operating as a two-level inverter, and is applicable to an uninterruptible power supply system (UPS), an electric vehicle, or the like.

Reference Signs List 1, 2 . . . Direct current power supply
10 . . . Motor
11a to 11d . . . Gate drive circuit
12 . . . Control circuit
15a to 15d . . . Detector circuit
17 . . . Sense IGBT
18, 19 . . . Resistor
T1 to T6 . . . IGBT
T7 to T12 . . . Reverse blocking IGBT
D1 to D6, 14a to 14d . . . Diode

The invention claimed is:

1. A three-level power conversion circuit system for outputting potential at levels selected from among three absolute values during conversion of power from two series-connected DC power supplies to alternating current, comprising:
   a plurality of one-phase switch circuits that receive power from the two DC power supplies, each of the one-phase switch circuits including
      a semiconductor switch series circuit in which first and second semiconductor switches are connected in series and the series is connected in parallel to the DC power supplies,
      diodes that are connected in anti-parallel to the first and second semiconductor switches;
      a bidirectional semiconductor switch circuit in a circuit path between a series connection point of the semiconductor switch series circuit and a series connection point of the DC power supplies, and
      opening means in the circuit path for opening the circuit path if the bidirectional semiconductor switch circuit fails,
   wherein the bidirectional switch circuits in all of the one-phase switch circuits are placed in a constant off-state, if the bidirectional semiconductor switch circuit in any of the one-phase switch circuits fails, and
   wherein after any of the bidirectional switch circuits fails, operation of the power conversion circuit system is continued as a two-level output inverter system using the semiconductor switch series circuits of the one-phase switch circuits.

* * * * *